United States Patent [19]

Kusakata et al.

[11] Patent Number: 4,847,385
[45] Date of Patent: Jul. 11, 1989

[54] CYANINE DYES

[75] Inventors: Shigeru Kusakata, Susono; Aimi Suzuki; Isao Shiojima, both of Numazu, all of Japan

[73] Assignee: Ricoh Company, Ltd., Tokyo, Japan

[21] Appl. No.: 31,374

[22] Filed: Mar. 30, 1987

[30] Foreign Application Priority Data

Mar. 28, 1986 [JP]  Japan .................. 61-72073
Apr. 1, 1986 [JP]  Japan .................. 61-75162
May 29, 1986 [JP]  Japan .................. 61-125110

[51] Int. Cl.$^4$ .......................... C07D 403/06
[52] U.S. Cl. ..................... 548/455; 428/167; 428/199
[58] Field of Search ........................ 548/455

[56]  References Cited

U.S. PATENT DOCUMENTS

| 1,524,791 | 2/1925 | Konig | 548/455 |
| 1,863,679 | 7/1932 | Wahl | 548/455 |
| 3,916,069 | 10/1975 | Tiers et al. | 428/411 |
| 4,460,665 | 7/1984 | Kunikane et al. | 428/199 |
| 4,600,625 | 7/1986 | Abe et al. | 428/167 |
| 4,735,839 | 4/1988 | Sato et al. | 428/64 |

FOREIGN PATENT DOCUMENTS 59-67092  4/1984  Japan ................. 428/913
61-47295  3/1986  Japan .

Primary Examiner—David B. Springer
Attorney, Agent, or Firm—Oblon, Spivak, McClelland, Maier & Neustadt

[57]  ABSTRACT

A cyanine dye having formula (I):

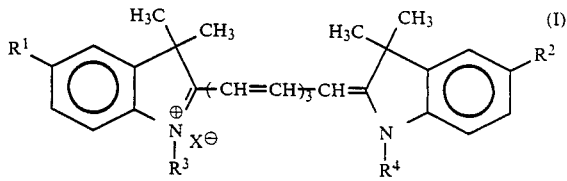

wherein
$R^1$ represents Cl, Br or hydrogen; $R^2$ represents Cl, Br, hydrogen, or a nitro group; $R^3$ and $R^4$ each represent a methyl group, an ethyl group, a propyl group or —$(CH_2)_nOR^5$ (in which n is an integer of 2 or 3, and $R^5$ represents hydrogen or an acetyl group), and $X^\ominus$ represents an acid anion, provided that the case where $R^3$ and $R^4$ are both an identical alkyl group, and $R^1$ and $R^2$ are an identical group, is excluded; and an optical information recording medium including a recording layer comprising the above cyanine dye.

8 Claims, No Drawings

CYANINE DYES

BACKGROUND OF THE INVENTION

The present invention relates to a new cyanine dye having a maximum absorption wavelength in the near infrared region, and an optical information recording medium employing the cyanine dye, and more particularly to a cyanine dye which is useful as a material for an optical information recording medium for recording information therein by means of a laser beam, and reproducing the recorded information therefrom by detecting the changes in the quantity of light reflected thereby, and to an optical information recording medium comprising a substrate and a recording layer comprising the cyanine dye.

Conventionally, an optical information recording medium having a thin film recording layer in which a cyanine dye is used is proposed, for example, in Japanese Laid-Open Patent Application No. 59-85791. The recording medium which uses the cyanine dye has an especially large absorption coefficient as compared with other dyes showing absorption in the near infrared range, so that its recording and reproduction sensitivity and S/N are high. In addition, it has high storage capabilities. This recording medium can be formed by using a variety of methods such as vaporizing or coating a thin film including the cyanine dye onto a substrate. The formation of a thin film by the coating method can be said to be an especially industrially advantageous method compared to other methods. However, a process must be used in which the cyanine dye is dissolved in an organic solvent to obtain a coating liquid. However conventionally known cyanine dyes including the above cyanine dye have low solubility in organic solvents and lack stability, so that the dispersibility and stability of the cyanine dyes in the dissolving process is poor. When such cyanine dyes are employed, the reproducibility of the recording and the storage capabilities of the recording medium are inadequate.

SUMMARY OF THE INVENTION

It is therefore an object of the present invention is to provide a novel cyanine dye which has a maximum absorption wavelength in the near infrared region and also has superior chemical stability and high solubility in most types of organic solvents.

The novel cyanine dye according to the present invention has the following general formula (I):

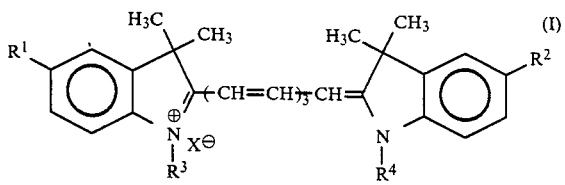

wherein $R^1$ represents Cl, Br, or hydrogen; $R^2$ represents Cl, Br, hydrogen, or a nitro group; $R^3$ and $R^4$ each represent a methyl group, an ethyl group, a propyl group, or $-(CH_2)_nOR^5$ (in which n is an integer of 2 or 3, and $R^5$ represents hydrogen or an acetyl group), and $X^\ominus$ represents an acid anion, provided that the case where $R^3$ and $R^4$ are both an identical alkyl group, and $R^1$ and $R^2$ are an identical group, is excluded. Examples of the acid anion are halogen anion, alkylsulfonate anion, arylsulfonate anion, perchlorate anion and tetrafluoroborate anion.

Another object of the present invention is to provide an optical information recording medium containing the above cyanine dye in a recording layer thereof.

DETAILED DESCRIPTION OF THE PREFERRED EMBODIMENTS

As mentioned previously, the cyanine dye according to the present invention has the following general formula (I):

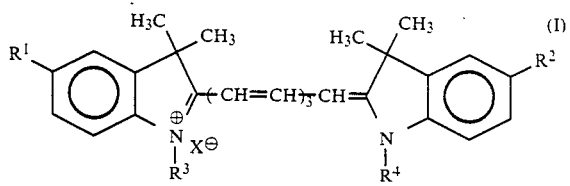

wherein $R^1$ represents Cl, Br or hydrogen; $R^2$ represents Cl, Br, hydrogen, or a nitro group; $R^3$ and $R^4$ each represent a methyl group, an ethyl group, a propyl group or $-(CH_2)_nOR^5$ (in which n is an integer of 2 or 3, and $R^5$ represents hydrogen or an acetyl group), and $X^\ominus$ represents an acid anion, provided that the case where $R^3$ and $R^4$ are both an identical alkyl group, and $R^1$ and $R^2$ are an identical group is excluded.

In the present invention, the following three specific examples of the cyanine dyes, which are covered by the above general formula (I), are particularly useful:

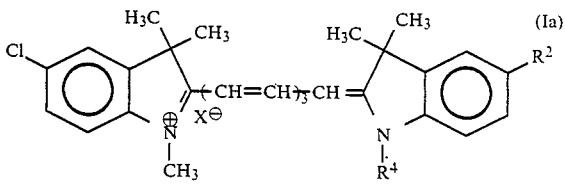

wherein $R^2$ is Cl, Br, hydrogen or a nitro group, and $R^4$ is a methyl group, or $-(CH_2)_nOR^5$ (in which n is an integer of 2 or 3, and $R^5$ is hydrogen or an acetyl group), and $X^\ominus$ is an acid anion, provided that when $R^2$ is Cl, $R^4$ is $-(CH_2)_nOR^5$.

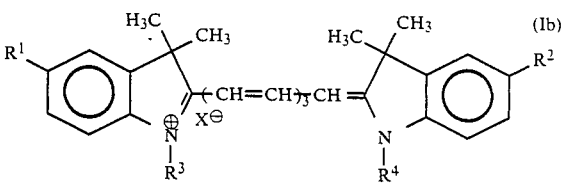

wherein $R^1$ and $R^2$ are each Cl or hydrogen, $R^3$ and $R^4$ are each a methyl group, an ethyl group or a propyl group, and $X^\ominus$ is an acid anion, provided that the case where $R^1$ and $R^2$ are identical, and $R^3$ and $R^4$ are identical, is excluded.

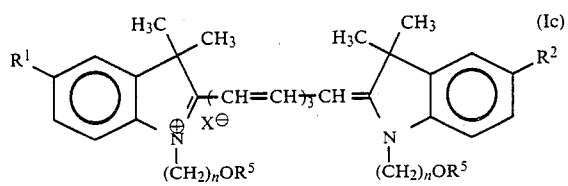
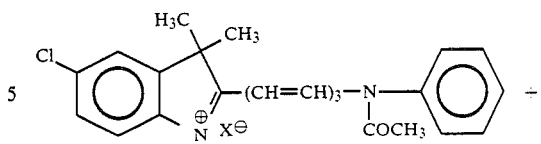
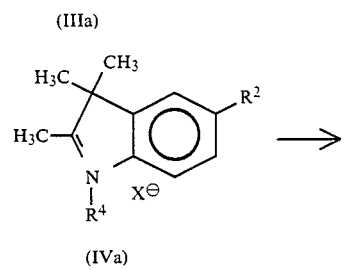
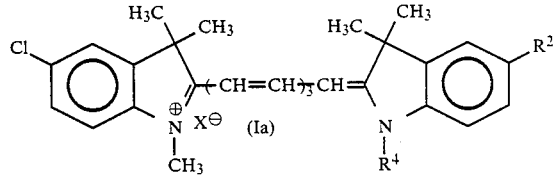

wherein $R^1$ and $R^2$ are each Cl, Br or hydrogen, n is an integer of 2 or 3, and $R^5$ is hydrogen or an acetyl group, and $X^\ominus$ is an acid anion.

The cyanine dye of the present invention represented by the general formula (I) has a maximum absorption wavelength in the near infrared region and is chemically stable. Further it is soluble in alcohols such as methanol, ethanol and isopropanol; in ketones such as acetone, methyl ethyl ketone, and cyclohexanone; in ethers such as ethyl ether, dioxane, and tetrahydrofuran; and in other organic solvents such as chloroform, 1,2-dichloroethane, and dimethyl formamide; and in the mixed solvents of the above solvents.

Accordingly, the cyanine dye of the present invention has the advantage that it can be used not only as a medium for reproducing a recording by means of a laser beam, but also as a photosensitive material for copying and printing. In addition, it can also be used as a sensitizing dye for silver halide photograph, as an optical filter, as a material for display, and as a material for paints and the like.

The cyanine dye of the present invention can be synthesized by the application of the various types of manufacturing methods which are conventionally known in this field.

The cyanine dye of the formula (Ia) can be synthesized by using the following two reaction processes:

In the first process, as shown below, 1,2,3,3-tetramethyl-5-chloroindolenium salt (IIa) is allowed to react with 1-anilino-5-anilino-penta-1,3-diene hydrochloride in an equimolar ratio to synthesize 2-(6'-acetoanilinohexa-1',3',5'-trienyl)-1,3,3-trimethyl-5-chloroindolenium salt (IIIa), which is an intermediate for the synthesis of the cyanine dye of the formula (Ia).

wherein $R^2$ is Cl, Br, hydrogen or a nitro group, and $R^4$ is a methyl group, or $-(CH_2)_nOR^5$ (in which n is an integer of 2 or 3, and $R^5$ is hydrogen or an acetyl group), and $X^\ominus$ is an acid anion, provided that when $R^2$ is Cl, $R^4$ is $-(CH_2)_nOR^5$. In both the above processes, acetic anhydride and alcohols can be used as reaction solvents, and the reaction is carried out at 70°~120° C. for 0.5~5.0 hours. The reaction can be accelerated by the addition of a weak base such as sodium acetate when acetic anhydride is used as the reaction solvent, or sodium acetate, a tertiary amine such as triethyl amine, or piperazine when alcohols are used as the reaction solvent.

The cyanine dye in which $R^5$ is an acetyl group in the formula (Ia) can be synthesized by allowing the intermediate (IIIa) to react with the indolenium salt derivative (IVa) in which $R^4$ is a hydroxyalkyl group are

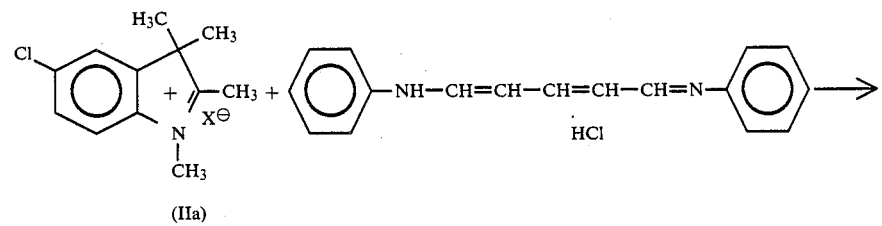

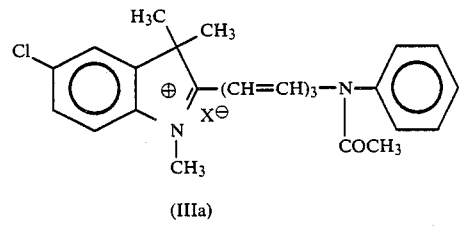

In the second process, the above intermediate (IIIa) is allowed to react with an indolenium salt derivative having formula (IVa) in an equimolar ratio to synthesize the cyanine dye of the formula (Ia) as shown below:

reacted, using acetic anhydride as the reaction solvent. Specifically, when the reaction is performed in acetic anhydride, the hydroxy alkyl group is acetylated at the same time as the cyanine dye is formed.

In the above reaction, commercially available 1,2,3,3-tetramethyl-5-chloroindolenium salt can be used as the starting material. In this case, however, it must be purified before use.

Another indolenium salt derivative (IVa) can be synthesized using, for example, the following method:

Phenylhydrazine hydrochloride or a substituted phenylhydrazine derivative hydrochloride and 3-methyl-2-butanone are heated under reflux in ethanol under an acidic condition using sulfuric acid to synthesize a 2,3,3-trimethyl indolenine derivative. The thus synthesized indolenine derivative is then reacted with methyl iodide, 2-bromoethanol or 3-bromo-1-propanol at 70°~120° C. for 0.5 to 5.0 hours to synthesize a 2,3,3-trimethyl-indolenium salt derivative in which $R^4$ is a methyl group or a hydroxyalkyl group.

1-anilino-5-anilino-penta-1,3-diene hydrochloride can be synthesized by following the procedure as shown in an example described in Ogata et al. Bull. Instg. Phys. Chem. Res. (Tokyo), 13. P 511 (1934).

The cyanine dye of the formula (Ib) can also be synthesized in the same manner as in the cyanine dye of the formula (Ia) by using the following two reaction processes.

In the first process, and indolenium salt derivative of formula (IIb) is allowed to react with 1-anilino-5-anilinopenta-1,3-diene hydrochloride in an equimolar ratio to synthesize an intermediate (IIIb).

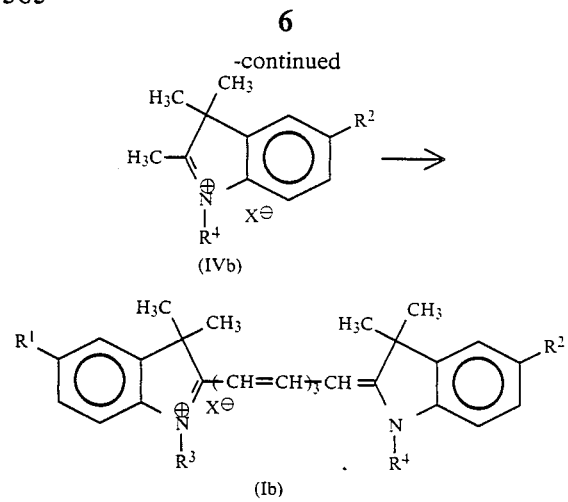

wherein $R^1$ and $R^2$ are each Cl or hydrogen, $R^3$ and $R^4$ are each a methyl group, an ethyl group or a propyl group, and $X^\ominus$ is an acid anion, provided that the case where $R^1$ and $R^2$ are identical, and $R^3$ and $R^4$ are identical, is excluded.

In both the above processes, acetic anhydride and alcohols can be used as reaction solvents, and the reaction is carried out at 70°~120° C. for 0.5~5.0 hours. The reaction can be accelerated by the addition of a weak base such as sodium acetate when acetic anhydride is used as the reaction solvent, or sodium acetate, a tertiary amine such as triethyl amine, or piperazine when alcohols are used as the reaction solvent.

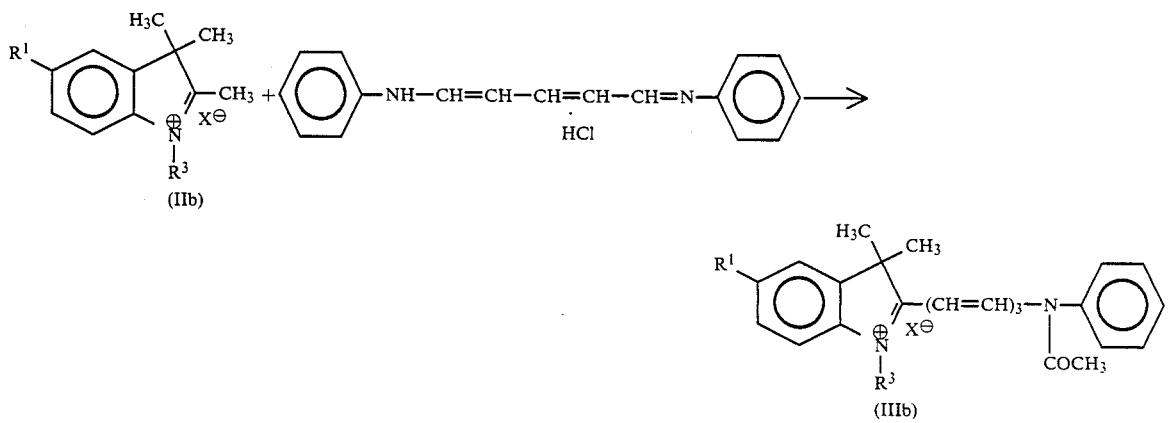

The indolenium salt derivative, which is employed as the starting material in the above reaction, can be synthesized, for example, by the following method:

Phenylhydrazine hydrochloride or 4-chlorophenylhydrazine hydrochloride and 3-methyl-2-butanone are heated under reflux in ethanol under an acidic condition using sulfuric acid to synthesize a 2,3,3-trimethylindolenine derivative. The indolenine derivative is then reacted with a dialkyl sulfate or with an alkyl halide at 50°~120° C. for 0.5 to 5.0 hours, whereby the indolenium salt, for example, a 1-alkyl-2,3,3-trimethylindolenium salt derivative, can be synthesized.

In the second process, the above intermediate (IIIb) is allowed to react with an indolenium salt derivative having formula (IVb) in an equimolar ratio to synthesize the cyanine dye of the formula (Ib) as shown below:

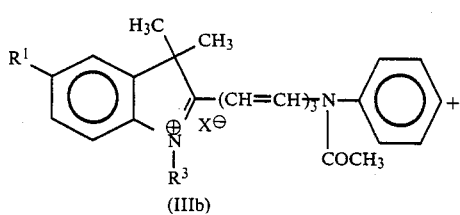

The cyanine dye having the following formula (Ic) can be prepared as follows:

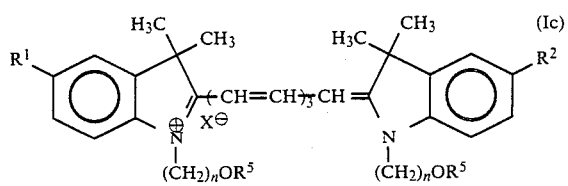

wherein $R^1$ and $R^2$ are each Cl, Br or hydrogen, n is an integer of 2 or 3, and $R^5$ is hydrogen or an acetyl group, and $X^\ominus$ is an acid anion.

A cyanine dye in which $R^5$ in the above formula is hydrogen can be synthesized by heating under reflux a 2,3,3-trimethylindolenium salt derivative having a hydroxyalkyl group at a 1-position thereof and 1-anilino-5-anilino-penta-1,3-diene hydrochloride in an alcohol solvent in the presence of sodium acetate or a tertiary amine for several hours.

Alternatively, the above cyanine dye can be synthesized by heating under reflux a 2,3,3-trimethylindolenium salt derivative having a hydroxyalkyl group at a 1-position thereof and 2,4-dinitrophenylpyridium chloride in pyridine for several hours.

A cyanine dye in which $R^5$ in the above formula is an acetyl group can be synthesized by reacting a 2,3,3-trimethylindolenium salt derivative having a hydroxyalkyl group at a 1-position thereof and 1-anilino-5-anilino- penta-1,3-diene hydrochloride in acetic anhydride in the presence of sodium acetate at 90°~120° C. for several hours. In this case, this cyanine dye is formed simultaneously with the acetylation of the hydroxyalkyl groups at the 1-positions of the indolenine structure.

The 2,3,3-trimethylindolenium salt derivative having a hydroxyalkyl group at a 1-position thereof, which serves as the starting material in the above reaction, can be synthesized as follows:

A phenylhydrazine derivative hydrochloride, which may have as a substituent Cl or Br at a 4-position thereof, and 3-methyl-2-butanone are heated under reflux in ethanol under an acidic condition using sulfuric acid, whereby a 2,3,3-trimethylindolenine derivative can be synthesized which has as a substituent Cl or Br at a 5-position when the starting material has the above substituent.

The thus synthesized 2,3,3-trimethylindolenine derivative is then reacted with 2-bromoethanol or 3-bromo-1-propanol at 90°~110° C. for several hours, whereby a 2,3,3-trimethylindolenium salt derivative having a hydroxyalkyl group at the 1-positions can be synthesized.

An optical information recording medium employing the cyanine dye according to the present invention can be prepared by dissolving the cyanine dye in a solvent previously mentioned to prepare a coating liquid, and coating the liquid on a substrate to form a thin layer of the cyanine dye thereon. The substrate can be made of any materials which are employed for a substrate of conventional recording medium, for instance, glass, quarz, ceramics, plastics, paper or a metal plate or foil. This coating can be performed by a conventional coating method such as spray coating, roller coating, dipping coating and spinning coating.

With reference to the following examples, the present invention will now be explained in more detail.

EXAMPLE 1-1

Preparation of 1,3,3-trimethyl-5-chloroindo-,1′,3′,3′-trimethylindo-2:2′-heptamethine cyanine perchlorate

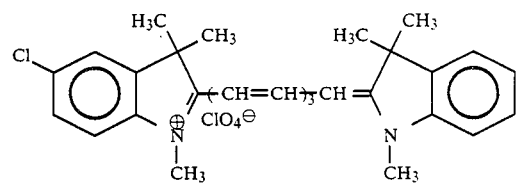

2-(6′-acetonanilinohexa-1′,3′,5-trienyl)-,1,3,3-trimethyl-5-chloroindolenium perchlorate having the following formula,

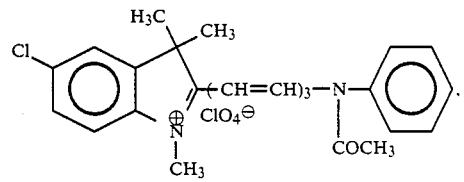

which is the starting material of the above cyanine perchlorate, was synthesized as follows:

29.6 g of 1,2,3,3-teramethyl-5-chloroindolenium perchlorate, 29.6 g of 1-anilino-5-anilino-penta-1,3-diene hydrochloride (m.p. 137°~139° C.), 8.2 g of sodium acetate, and 250 ml of acetic anhydride were heated, with stirring, at 110° C. for 3 hours. The reaction mixture was then cooled. Crystals separated from the reaction mixture, which were filtered off, washed with water, then with methanol several times, whereby 2-(6′-acetonanilinohexa-1′,3′,5′-trienyl)-1,3,3-trimethyl-5-chloroindolenium perchlorate was obtained. For washing the product, chloroform and acetone can also be employed. The yield was 18.3 g and the melting point was 163°~165° C.

4.6 g of 2-(6′-acetonanilinohexa-1′,3′,5′-trienyl)-1,3,3-trimethyl-5-chloroindolenium perchlorate as obtained above, 2.7 g of 1,2,3,3-tetramethylindolenium perchlorate (m.p. 203°~204° C.), 0.82 g of sodium acetate, and 50 ml of n-butanol were reacted at 90°~100° C. for 1.5 hours. The reaction mixture was then cooled. Crystals separated from the reaction mixture, which were filtered off, washed with water, and recrystallized from methanol several times. Thus, 1,3,3-trimethyl-5-chloroindo-1′,3′,3′-trimethylindo-2:2′-heptamethine cyanine perchlorate was obtained.

The yield was 2.7 g and the melting point was 231°~231.5° C. The maximum absorption wavelength was 748 nm in ethanol.

EXAMPLE 1-2

Preparation of
1,3,3-trimethyl-5-chloroindo-1'-β-hydroxyethyl-3',3'-dimethyl-5'-chloroindo-2:2'-heptamethine perchlorate

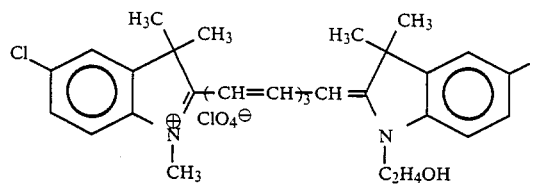

3.3 g of 2-(6'-acetonanilinohexa-1',3',5'-trienyl)-1,3,3-trimethyl-5-chloroindolenium perchlorate prepared in Example 1-1, 2.3 g of 1-β-hydroxyethyl-2,3,3-trimethyl-5-chloroindolenium bromide (m.p. 215° C.), 0.71 g of sodium acetate, and 50 ml of n-butanol were reacted at 90°~100° C. for 1.5 hours. After cooling, crystals separated from the reaction mixture, which were filtered off, washed with water, and recrystallized from methanol several times. Thus, 1,3,3-trimethyl-5-chloroindo-1'-β-hydroxyethyl-3',3'-dimethyl-5'-chloroindo-2:2'-heptamethine perchlorate was obtained.

The yield was 1.9 g and the melting point was 210°~211.5° C. The maximum absorption wavelength was 750 nm in ethanol.

EXAMPLE 1-3

Preparation of
1,3,3-trimethyl-5-chloroindo-1'-γ-hydroxypropyl-3',3'-dimethyl-5'-chloroindo-2:2'-heptamethine perchlorate

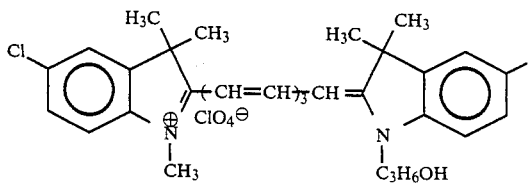

4.19 g of 2-(6'-acetonanilinohexa-1',3',5'-trienyl)-1,3,3-trimethyl-5-chloroindolenium perchlorate prepared in Example 1-1, 3.27 g of 1-γ-hydroxyethyl-2,3,3-trimethyl-5-chloroindolenium perchlorate (m.p. 140.5°~142° C.), 0.76 g of sodium acetate, and 50 ml of n-butanol were reacted at 90°~100° C. for 1.5 hours. After cooling, crystals separated from the reaction mixture, which were filtered off, and recrystallized from methanol several times. Thus, 1,3,3-trimethyl-5-chloroindo-1'-γ-hydroxy-ethyl-3',3'-dimethyl-5'-chloroindo-2:2'-heptamethine perchlorate was obtained.

The yield was 1.1 g and the melting point was 211°~211.5° C. The maximum absorption wavelength was 750 nm in ethanol.

EXAMPLE 1-4

Preparation of 1,3,3-trimethyl-5-chloroindo-1',3',3'-trimethyl-5'-nitroindo-2:2'-heptamethine perchlorate

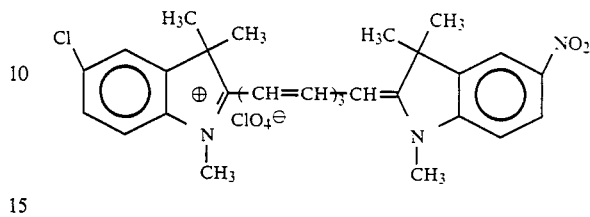

4.5 g of 2-(6'-acetonanilinohexa-1',3',5'-trienyl)-1,3,3-trimethyl-5-chloroindolenium perchlorate prepared in Example 1-1, 3.5 g of 1,2,3,3-tetramethyl-5-nitroindolenium iodide (m.p. 203°~204° C.), 0.98 g of sodium acetate, and 50 ml of n-butanol were reacted at 90°~110° C. for 1.5 hours. After cooling, crystals separated from the reaction mixture, which were filtered off, and washed with hot methanol. The crystals were then dissolved in 1,2-dichloroethane under application of heat to prepare a solution. This solution was then dropwise added to cold ethanol to reprecipitate the crystals. Thus, 1,3,3-trimethyl-5-chloroindo-1',3',3'-trimethyl-5'-nitroindo-2:2'-heptamethine perchlorate was obtained.

The yield was 1.7 g and the melting point was 236°~237° C. The maximum absorption wavelength was 750 nm in ethanol.

Example 1-5

Preparation of
1,3,3-trimethyl-5-chloroindo-1'-β-hydroxyethyl-3',3'-dimethyl-5'-bromoindo-2:2'-heptamethine cyanine perchlorate

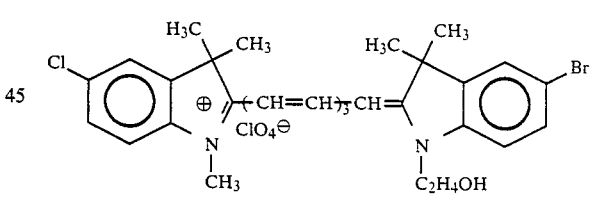

4.5 g of 2-(6'-acetonanilinohexa-1',3',5'-trienyl)-1,3,3-trimethyl-5-chloroindolenium perchlorate prepared in Example 1-1, 3.8 g of 1-8-hydroxyethyl-2,3,3-trimethyl-5-bromoindo perchlorate (m.p. 208°~209° C.), 0.98 g.of sodium acetate, and 50 ml of n-butanol were reacted at 90°~110° C. for 1.5 hours. After cooling, crystals separated from the reaction mixture, which were filtered off, and washed with methanol. The crystals were then dissolved in 1,2-dichloroethane under application of heat to prepare a solution. This solution was then dropwise added to cold ethanol to reprecipitate the crystals. Thus, 1,3,3-trimethyl-5-chloroindo-1'-β-hydroxyethyl-3',3'-dimethyl-5'-bromoindo-2:2'-heptamethine cyanine perchlorate was obtained.

The yield was 2.1 g and the melting point was 233°~234° C. The maximum absorption wavelength was 749 nm in ethanol.

EXAMPLE 1-6

Preparation of 1,3,3-trimethyl-5'-chloroindo-1'-β-acetoxyethyl-3',3'-dimethylindo-2:2'-heptamethine cyanine perchlorate

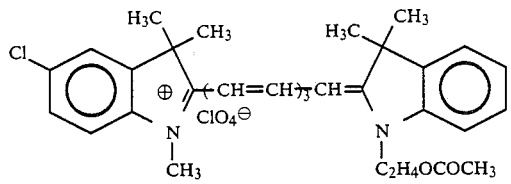

4.0 g of 2-(6'-acetonanilinohexa-1',3',5'-trienyl)-1,3,3-trimethyl-5-chloroindolenium perchlorate prepared in Example 1-1, 2.6 g of 1-β-hydroxyethyl-2,3,3-trimethylindolenium bromide (m.p. 198°~199° C.), 0.85 g of sodium acetate, and 40 ml of acetic anhydride were reacted at 90°~110° C. for 1 hour. After cooling, the reaction mixture was poured into ice water and stirred for a short time, after which the supernatant liquid was removed by decantation. 100 ml of ethanol was added to the remaining reaction mixture, which was heated, with stirring, for 1 hour. After cooling, crystals separated from the reaction mixture, which were filtered off, and recrystallized from methanol. Thus, 1,3,3-trimethyl-5-chloroindo-1'-β-acetoxyethyl-3',3'-dimethylindo-2:2'-heptamethine cyanine perchlorate was obtained.

The yield was 0.9 g and the melting point was 203.5°~205.5° C. The maximum absorption wavelength was 746 nm in ethanol.

EXAMPLE 1-7

Preparation of 1,3,3-trimethyl-5-chloroindo-1'-β-acetoxyethyl-3',3'-dimethyl-5'-chloroindo-2:2'-heptamethine cyanine perchlorate

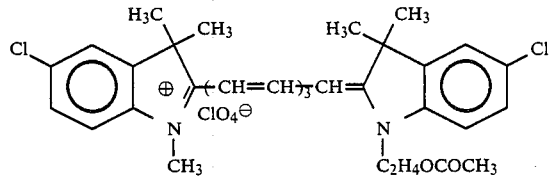

4.5 g of 2-(6'-acetonanilinohexa-1',3',5'-trienyl)-1,3,3-trimethyl-5-chloroindolenium perchlorate prepared in Example 1-1, 3.2 g of 1-β-hydroxyethyl-2,3,3-trimethyl-5-chloroindolenium bromide, 0.98 g of sodium acetate, and 40 ml of acetic anhydride were reacted at 90°~112° C. for 1 hour. After cooling, the reaction mixture was poured into ice water and stirred for a short time. Crystals separated from the reaction mixture, which were filtered off and then recrystallized from methanol. Thus, 1,3,3-trimethyl-5-chloroindo-1'-β-acetoxyethyl-3',3'-dimethyl-5'-chloroindo-2'-heptamethine cyanine perchlorate was obtained.

The yield was 1.0 g and the melting point was 208.5°~210° C. The maximum absorption wavelength was 748 nm in ethanol.

EXAMPLE 1-8

Preparation of 1,3,3-trimethyl-5-chloroindo-1'-γ-acetoxypropyl-3',3'-dimethyl-5'-bromoindo-2:2'-heptamethine cyanine perchlorate

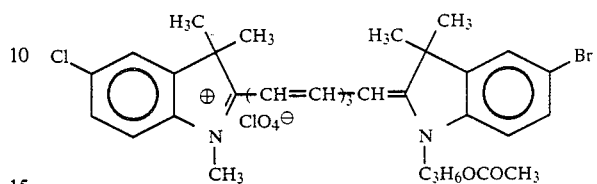

4.5 g of 2-(6'-acetonanilinohexa-1',3',5'-trienyl)-1,3,3-trimethyl-5-chloroindolenium perchlorate prepared in Example 1-1, 4.1 g of 1-γ-hydroxypropyl-2,3,3-trimethyl-5-bromoindolenium perchlorate (m.p. 142.5°~144° C.), 0.98 g of sodium acetate, and 40 ml of acetic anhydride were reacted at 90°~110° C. for 1 hour. After cooling, the reaction mixture was poured into ice water and stirred for a short time, after which crystals separated from the reaction mixture. The crystals were filtered off, to which 100 ml of ethanol was then added, and the mixture was heated, with stirring, for 1 hour. After cooling, crystals separated from the mixture, which were filtered off and then recrystallized from methanol. Thus, 1,3,3-trimethyl-5-chloroindo-1'-γ-acetoxypropyl-3',3'-dimethyl-5'-bromoindo-2:2'-heptamethine cyanine perchlorate was obtained.

The yield was 1.6 g and the melting point was 212°~214° C. The maximum absorption wavelength was 747 nm in ethanol.

EXAMPLE 1-9

The cyanine dye synthesized in Example 1-1 was dissolved in methanol to obtain a 1 wt. % methanol solution of the cyanine dye.

This solution was applied by a spinner to an acryl substrate and dried to obtain a recording layer with a thickness of 450 Å on the substrate, whereby an optical information recording medium No. 1-1 according to the present invention was prepared.

This recording medium was subjected to a signal recording and reproduction test in which signals of 0.7 MHz were recorded in the recording medium by semiconductor a laser beam having a wavelength of 790 nm under the conditions that the beam diameter was 1.54 μm and the line speed was 1.2 m/sec. The recorded signals were then reproduced by a laser beam having a lower power than that of the laser beam for recording. The initial C/N value was 56 dB.

This recording medium was subjected to a preservability test in which the recording medium was allowed to stand in an oven at 70° C. for 40 days, and thereafter, signal recording and reproduction were performed in the same manner as mentioned above. The result was that the C/N value after the test was 49 dB. This indicates that the optical information recording medium in which the cyanine dye according to the present invention is employed has significantly better optical recording and reproduction characteristics as compared to conventional optical information recording mediums.

EXAMPLE 1-10

The cyanine dye synthesized in Example 1-3 was dissolved in ethanol to obtain a 1 wt. % ethanol solution of the cyanine dye.

This solution was applied by a spinner to an acryl substrate and dried to obtain a recording layer with a thickness of 450 Å on the substrate, whereby an optical information recording medium No. 1-2 according to the present invention was prepared.

This recording medium was subjected to the same signal recording and reproduction test as in Example 1-9. The result was that the initial C/N value was 55 dB.

This recording medium was further subjected to the same preservability test as in Example 1-9. The result was that the C/N value after the test was 50 dB, which indicates that the optical information recording medium No. 1-2 is as excellent as the optical information recording medium No. 1-1.

EXAMPLE 1-11

The cyanine dye synthesized in Example 1-5 was dissolved in 1,2-dichloroethane to obtain a 1 wt. % dichloroethane solution of the cyanine dye.

This solution was applied by a spinner to an acryl substrate and dried to obtain a recording layer with a thickness of 450 Å on the substrate, whereby an optical information recording medium No. 1-3 according to the present invention was prepared.

The recording medium was subjected to the same signal recording and reproduction test as in Example 1-9. The result was that the initial C/N value was 55 dB.

This recording medium was also subjected to the same preservability test as in Example 1-9. The result was that the C/N value after the test was 50 dB, which indicates that the optical information recording medium No. 1-3 is as excellent as the optical information recording medium No. 1-1.

EXAMPLE 2-1

Preparation of
1,3,3-trimethyl-5-chloroindo-1'-ethyl-3',3'-dimethylindo-2:2'-heptamethine perchlorate

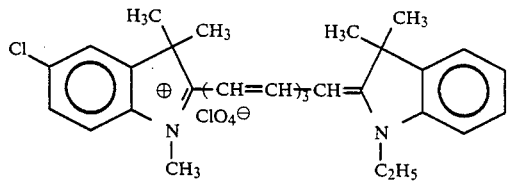

4.6 g of 2-(6'-acetonanilinohexa-1',3',5'-trienyl)-1,3,3-trimethyl-5-chloroindolenium perchlorate prepared in Example 1-1, 2.9 g of 1-ethyl-2,3,3-trimethylindolenium perchlorate (m.p. 209°~211° C.), 0.82 g of sodium acetate, and 50 ml of n-butanol were reacted at 90°~100° C. for 1.5 hours. After cooling, crystals separated from the reaction mixture, which were filtered off, and recrystallized from methanol several times. Thus, 1,3,3-trimethyl-5-chloroindo-1'-ethyl-3',3'-dimethylindo-2:2'-heptamethine perchlorate was obtained.

The yield was 3.4 g. The melting point was 209°~210° C. The maximum absorption wavelength was 748 nm in ethanol.

EXAMPLE 2-2

Preparation of
1,3,3-trimethyl-5-chloroindo-1'-ethyl-3',3'-dimethyl-5'-chloroindo-2:2'-heptamethine perchlorate

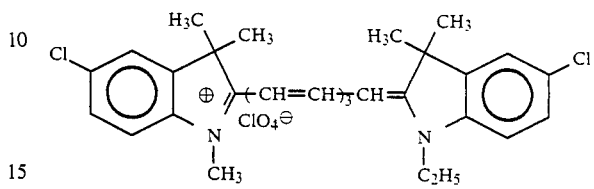

4.6 g of 2-(6'-acetonanilinohexa-1',3',5'-trienyl)-1,3,3-trimethyl-5-chloroindolenium perchlorate prepared in Example 1-1, 3.2 g of 1-ethyl-2,3,3-trimethyl-5-choroindolenium ethylsulfonate (m.p. 165°~166° C.), 0.82 g of sodium acetate, and 50 ml of n-butanol were reacted at 90°~100° C. for 1.5 hours. After cooling, crystals separated from the reaction mixture, which were filtered off, and washed with hot methanol. Thus, 1,3,3-trimethyl-5-chloroindo-1'-ethyl-3',3'-dimethyl-5'-chloroindo-2:2'-heptamethine perchlorate was obtained.

The yield was 3.07 g and the melting point was 225°~226° C. The maximum absorption wavelength was 752 nm in ethanol.

EXAMPLE 2-3

Preparation of
1,3,3-trimethyl-5-chloroindo-1'-propyl-3',3'-dimethylindo-2:2'-heptamethine perchlorate

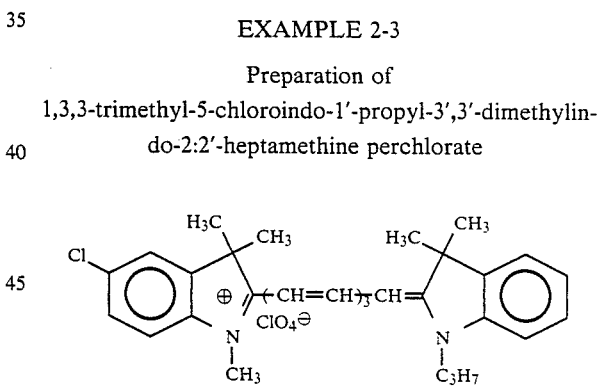

4.6 g of 2-(6'-acetonanilinohexa-1',3',5'-trienyl)-1,3,3-trimethyl-5-chloroindolenium perchlorate prepared in Example 1-1, 3.02 g of 1-propyl-2,3,3-trimethylindolenium perchlorate (m.p. 164°~166° C.), 0.82 g of sodium acetate, and 50 ml of n-butanol were reacted at 90°~100° C. for 1.5 hours. After cooling, crystals separated from the reaction mixture, which were filtered off, washed with water and then with hot methanol. Thus, 1,3,3-trimethyl-5-chloroindo-1'-propyl-3',3'-dimethylindo-2:2'-heptamethine cyanine perchlorate was obtained.

The yield was 1.98 g. The melting point was 175°~177° C. The maximum absorption wavelength was 748 nm in ethanol.

EXAMPLE 2-4

Preparation of 1,3,3-trimethyl-5-chloroindo-1'-propyl-3',3'-dimethyl-5'-chloroindo-2:2'-heptamethine cyanine perchlorate

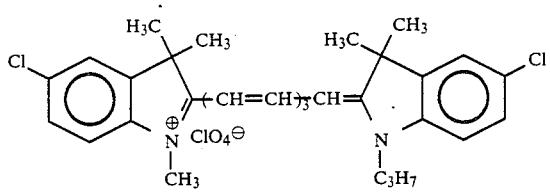

4.6 g of 2-(6'-acetonanilinohexa-1',3',5'-trienyl)-1,3,3-trimethyl-5-chloroindolenium perchlorate prepared in Example 1-1, 3.4 g of 1-propyl-2,3,3-trimethyl-5-chloroindolenium perchlorate (m.p. 197°~199° C.), 0.82 g of sodium acetate, and 50 ml of n-butanol were reacted at 90°~100° C. for 1.5 hours. After cooling, crystals separated from the reaction mixture, which were filtered off, washed with water and then with hot methanol. Thus, 1,3,3-trimethyl-5-chloroindo-1'-propyl-3',3'-dimethyl-5'-chloroindo-2:2'-heptamethine cyanine perchlorate was obtained.

The yield was 3.1 g. The melting point was 219°~221° C. The maximum absorption wavelength was 754 nm in ethanol.

EXAMPLE 2-5

Preparation of 1-ethyl-3,3-dimethyl-1'-ethyl-3',3'-dimethyl-5'-chloroindo-2:2'-heptamethine cyanine perchlorate

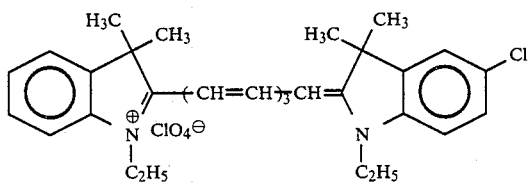

2-(6'-acetonanilinohexa-1',3',5'-trienyl)-1-ethyl-3,3dimethylindolenium perchlorate having the following formula,

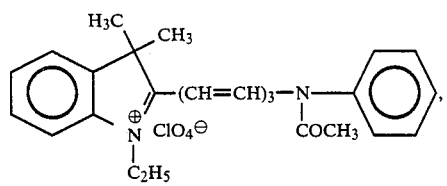

which is the starting material of the above cyanine perchlorate, was synthesized as follows: 8.8 g of 1-ethyl-2,3,3-trimethyl-indolenium perchlorate, 9.1 g of 1-anilino-5-anilino-penta-1,3-diene hydrochloride, 2.6 g of sodium acetate, and 100 ml of acetic anhydride were reacted, with stirring, at 90°~100° C. for 1 hour. After cooling, crystals separated from the reaction mixture, which were filtered off, washed with water, then washed with methanol several times. Thus, 2-(6'-acetonanilinohexa-1',3',5'-trienyl)-1-ethyl-3,3-dimethylindolenium perchlorate was obtained. The yield was 9.1 g. The melting point was 218°~219° C.

4.4 g of 2-(6'-acetonanilinohexa-1',3',5'-trienyl)-1-ethyl-3,3-dimethylindolenium perchlorate prepared in the above, 3.2 g of 1-ethyl-2,3,3-trimethyl-5-chloroindolenium ethylsulfonate, 0.82 g of sodium acetate, and 50 ml of n-butanol were reacted at 90°~100° C. for 1.5 hours. After cooling, crystals separated from the reaction mixture, which were filtered·off, washed with water and then with hot methanol. Thus, 1-ethyl-3,3-dimethyl-1'-ethyl-3',3'-dimethyl-5'-chloroindo-2:2'-heptamethine cyanine perchlorate was obtained.

The yield was 3.2 g. The melting point was 221°~222° C. The maximum absorption wavelength was 748 nm in ethanol.

EXAMPLE 2-6

Preparation of 1-ethyl-3,3-dimethylindo-1',3',3'-trimethylindo-2:2'-heptamethine cyanine perchlorate

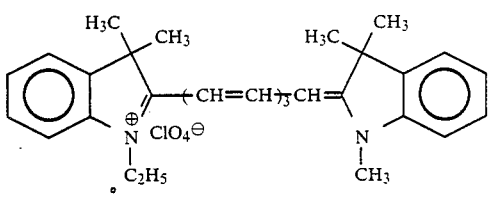

4.4 g of 2-(6'-acetonanilinohexa-1',3',5'-trienyl)-1-ethyl-3,3-dimethylindolenium perchlorate prepared in Example 2-5, 2.7 g of 1,2,3,3-tetramethylinodolenium perchlorate (m.p. 203°~204° C.), 0.82 g of sodium acetate, and 50 ml of n-butanol were reacted at 90°~100° C. for 1.5 hours. After cooling, crystals separated from the reaction mixture, which were filtered off, washed water and then with hot methanol. Thus, 1-ethyl-3,3-dimethylindo-1',3',3'-trimethyl-2:2'-heptamethine cyanine perchlorate was obtained.

The yield was 1.9 g. The melting point was 171°~173° C. The maximum absorption wavelength was 745 nm in ethanol.

EXAMPLE 2-7

Preparation of 1-propyl-3,3-dimethylindo-1'-propyl-3',3'-dimethyl-5'-chloroindo-2:2'-heptamethine cyanine perchlorate

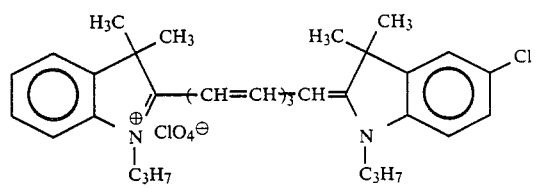

2-(6'-acetonanilinohexa-1',3',5'-trienyl)-1-propyl-3,3dimethylindolenium perchlorate having the following formula,

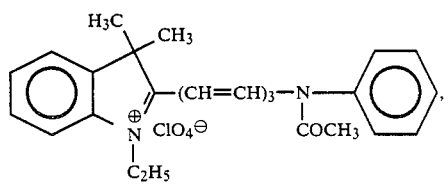

which is the starting material of the above cyanine perchlorate, was synthesized as follows:

21.1 g of 1-propyl-2,3,3-trimethyl-indolenium perchlorate, 20.9 g of 1-anilino-5-anilino-penta-1,3-diene hydrochloride, 6.0 g of sodium acetate, and 200 ml of acetic anhydride were reacted, with stirring, at 90°~110° C. for 1.5 hours. After cooling, crystals separated from the reaction mixture, which were filtered off, washed with water, then washed with methanol several times. Thus, 2-(6'-acetonanilinohexa-1',3',5'-trienyl)-1-propyl-3,3-dimethylindolenium perchlorate was obtained. The yield was 11.2 g and the melting point was 212°~213° C.

4.6 g of 2-(6'-acetonanilinohexa-1',3',5'-trienyl)-1-propyl-3,3-dimethylindolenium perchlorate prepared in the above, 3.4 g of 1-propyl-2,3,3-trimethyl-5-chloroindolenium perchlorate, 0.82 g of sodium acetate, and 50 ml of n-butanol were reacted at 90°~100° C. for 1.5 hours. After cooling, crystals separated from the reaction mixture, which were filtered off, washed water and then with hot methanol. Thus, 1-propyl-3,3-dimethylindo-1'-propyl-3',3'-dimethyl-5'-chloroindo- 2:2'-heptamethine cyanine perchlorate was obtained.

The yield was 1.7 g. The melting point was 176°~178° C. The maximum absorption wavelength was 751 nm in ethanol.

EXAMPLE 2-8

Preparation of 1-propyl-3,3-dimethyl-1'-ethyl-3',3'-dimethyl-5'-chloroindo-2:2'-heptamethine cyanine perchlorate

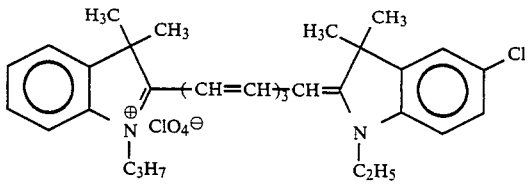

4.6 g of 2-(6'-acetonanilinohexa-1',3',5'-trienyl)-1-propyl-3,3-dimethylindolenium perchlorate prepared in Example 2-7, 3.2 g of 1-ethyl-2,3,3-trimethyl-5-chloroindolenium ethylsulfonate, 0.82 g of sodium acetate, and 50 ml of n-butanol were reacted at 90°~100° C. for 1.5 hours. After cooling, crystals separated from the reaction mixture, which were filtered off, washed with water and then with hot methanol. Thus, 1-propyl-3,3-dimethyl-1'-ethyl-3',3'-dimethyl-5'-chloroindo-2:2'-heptamethine cyanine perchlorate was obtained. The yield was 2.4 g. The melting point was 200°~202° C. The maximum absorption wavelength was 750 nm in ethanol.

EXAMPLE 2-9

The cyanine dye synthesized in Example 2-1 was dissolved in methanol to obtain a 1 wt. % methanol solution of the cyanine dye.

This solution was applied by a spinner to an acryl substrate and dried to obtain a recording layer with a thickness of 450 Å on the substrate, whereby an optical information recording medium No. 2-1 according to the present invention was prepared.

This recording medium was subjected to a signal recording and reproduction test in which signals of 0.7 MHz were recorded in the recording medium by a semiconductor laser beam having a wavelength of 790 nm under the conditions that the beam diameter was 1.54 μm and the line speed was 1.2 m/sec. The recorded signals were then reproduced by a laser beam having a lower power than that of the laser beam for recording. The initial C/N value was 55 dB.

This recording medium was subjected to a preservability test in which the recording medium was allowed to stand in an oven at 70° C. for 40 days, and thereafter, signal recording and reproduction were performed in the same manner as mentioned above.

The result was that the C/N value after the test was 50 dB. This indicates that the optical information recording medium in which the cyanine dye according to the present invention is employed has significantly better optical recording and reproduction characteristics as compared to conventional optical information recording mediums.

EXAMPLE 2-10

The cyanine dye synthesized in Example 2-4 was dissolved in 1,2-dichloroethane to obtain a 1 wt. % dichloroethane solution of the cyanine dye.

This solution was applied by a spinner to an acryl substrate and dried to obtain a recording layer with a thickness of 450 Å on the substrate, whereby an optical information recording medium No. 2-2 according to the present invention was prepared.

This recording medium was subjected to the same signal recording and reproduction test as in Example 2-9. The result was that the initial C/N value was 56 dB.

This recording medium was further subjected to the same preservability test as in Example 2-9. The result was that the C/N value after the test was 49 dB, which indicates that the optical information recording medium No. 2-2 is as excellent as the optical information recording medium No. 2-1.

EXAMPLE 2-11

The cyanine dye synthesized in Example 2-8 was dissolved in methanol to obtain a 1 wt. % methanol solution of the cyanine dye.

This solution was applied by a spinner to an acryl substrate and dried to obtain a recording layer with a thickness of 450 Å on the substrate, whereby an optical information recording medium No. 2-3 according to the present invention was prepared.

The recording medium was subjected to the same signal recording and reproduction test as in Example 2-9. The result was that the initial C/N value was 56 dB.

This recording medium was also subjected to the same preservability test as in Example 2-9. The result was that the C/N value after the test was 50 dB, which indicates that the optical information recording medium No. 2-3 is as excellent as the optical information recording medium No. 2-1.

EXAMPLE 3-1

Preparation of 1-β-hydroxyethyl-3,3-dimethyl-5-chloroindo-1'-β-hyroxyethyl-3',3'-dimethyl-5'-chloroindo-2:2'-heptamethine perchlorate

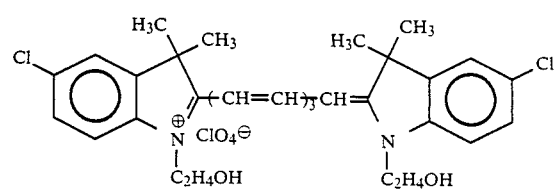

1-β-hydroxyethyl-2,3,3-trimethyl-5-chloroindolenium bromide having the following formula,

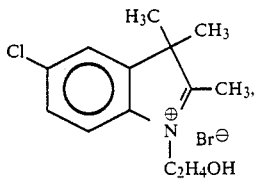

which is the starting material of the above cyanine perchlorate, was synthesized as follows:

60.9 g of 4-chlorophenylhydrazine hyrochloride, and 35.1 g of 3-methyl-2-butanone were dissolved in 450 ml of ethanol. To this solution, 37.5 ml of concentrated sulfuric acid was added. The mixture was heated under reflux for 1 hour. The solvent of this reaction mixture was removed and the remaining reaction mixture was made alkaline by addition of a 10% aqueous solution of sodium hydroxide. The aqueous mixture was extracted with ether. The extract was distilled under reduced pressure, whereby pure 2,3,3-trimethyl-5-chloroindolenine was obtained. The yield was 50.1 g. The boiling point was 103° C./2 mm Hg.

18.8 g of the above obtained 2,3,3-trimethyl-5-chloroindolenine was added to 12.1 g of 2-bromoethanol. The mixture was reacted, with stirring, at 100° C. for 1.5 hours. After cooling, crystals separated from the reaction mixture, which were washed with ethyl acetate, and then recrystallized from ethanol, so that 1-β-hydroxyethyl-2,3,3-trimethyl-5-chloroindolenium bromide was obtained. The yield was 18.2 g. The melting point was 215° C.

3.50 g of the above obtained 1-β-hyroxyethyl-2,3,3-trimethyl-5-chloroindolenium bromide, 1.42 g of 1-anilino-5-anilino-penta-1,3-diene hydrochloride (m.p. 137°~139° C.), and 0.82 g of sodium acetate were added to 20 ml of n-butanol. The mixture was heated, with stirring, at 100°~110° C. for 2 hours. After cooling, the reaction mixture was poured into 70 ml of an aqueous solution of sodium perchlorate containing 1.35 g of sodium perchlorate. To this mixture, 40 ml of toluene was further added, and the mixture was warmed with stirring. As a result, crystals were separated from the mixture. The crystals separated from the mixture were filtered off, and recrystallized from methanol several times, whereby 1-β-hydroxyethyl-3,3-dimethyl-5-chloroindo-1'-β-hydroxyethyl-3',3'-dimethyl-5'-chloroindo-2:2'-heptamethine perchlorate was obtained in the form of green crystals.

The yield was 1.21 g. The melting point was 217.5°~219° C. The maximum absorption wavelength was 753 nm in ethanol.

EXAMPLE 3-2

Preparation of 1-β-acetoxyethyl-3,3-dimethyl-5-chloroindo-1'-β-acetoxyethyl-3',3'-dimethyl-5'-chloroindo-2:2'-heptamethine perchlorate

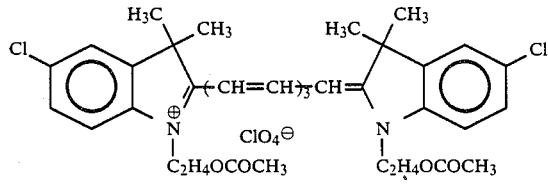

18.2 g of 1-β-hydroxyethyl-2,3,3-trimethyl-5-chloroindolenium bromide prepared in Example 3-1, 8.3 g of 1-anilino-5-anilinopenta-1,3-diene hydrochloride, 4.7 g of sodium acetate, and 100 ml of acetic anhydride were reacted at 100°~110° C. for 1.5 hours. After cooling, the reaction mixture was poured into 500 ml of an aqueous solution of sodium perchlorate containing 6.98 g of sodium perchlorate. The mixture was warmed with stirring for a short time. As a result, crystals were separated from the mixture, which were filtered off, washed with 100 ml of methanol and were then dissolved in 70 ml of 1,2-dichloroethane under application of heat. Insoluble components were removed from the mixture. Thereafter, ethanol was added to the mixture little by little. Green crystals separated from the mixture, which were filtered off and washed with methanol. Thus, 1-β-acetoxyethyl-3,3-dimethyl-5-chloroindo-1'-β-acetoxyethyl-3',3'-dimethyl-5'-chloroindo-2:2'-heptamethine perchlorate was obtained.

The yield was 15.0 g and the melting point was 209° C. The maximum absorption wavelength was 750 nm in ethanol. An infrared spectrum of the cyanine dye of Example 3-1, using a KBr tablet, shows a broad O-H stretching and vibration band at 3400 cm$^{-1}$, while in the case of the cyanine dye of Example 3-2, instead of the O-H band, a sharp band was observed at 1740 cm$^{-1}$ indicating the presence of an ester group.

EXAMPLE 3-3

Preparation of 1-γ-hydroxypropyl-3,3-dimethyl-5-chloroindo-1'-γ-hydroxypropyl-3',3'-dimethyl-5'-chloroindo-2:2'-heptamethine perchlorate

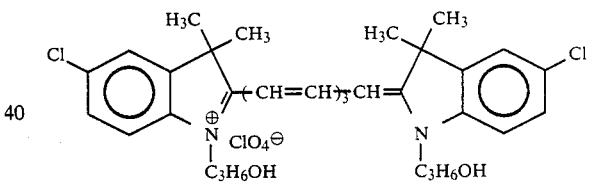

1-γ-hydroxypropyl-2,3,3-trimethyl-5-chloroindolenium perchlorate having the following formula,

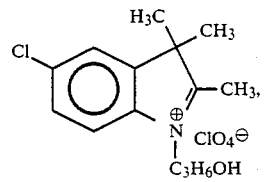

which is the starting material of the above cyanine perchlorate, was synthesized as follows:

19.4 g of 2,3,3-trimethyl-5-chloroindolenine, 13.9 g of 3-bromo-1-propanol, and 12.2 g of soldium perchlorate were reacted at 100°~110° C. for 1.5 hours. After cooling, crystals separated from the reaction mixture, which were filtered off, washed with ethyl acetate and then dissolved in acetone. Insoluble components were removed from the mixture. Thereafter, the solvent was distilled away from the mixture. Crystals separated again. The crystals separated were filtered off and recrystallized from ethanol. Thus, 1-γ-hydroxypropyl-2,3,3-trimethyl-5-chloroindolenium perchlorate was obtained. The yield was 16.1 g. The melting point was 140.5°~142° C.

5.0 g of the above obtained 1-γ-hyroxypropyl-2,3,3-trimethyl-5-chloroindolenium perchlorate, 2.0 g of 2,4-dinitrophenylpyridinium chloride (m.p. 200°~202° C.), and 200 ml of pyridine were heated under reflux for 2 hours. After cooling, the reaction mixture was poured into 500 ml of water. As a result, a slight viscous material was obtained. After the material was dried, it was washed with 1,2-dichloroethane and then recrystallized from methanol. Thus, 1-γ-hydroxypropyl-3,3-dimethyl-5-chloroindo-1″-γ-hyroxypropyl-3′,3′-dimethyl-5′-chloroindo-2:2′-heptamethine perchlorate was obtained in the form of green crystals.

The yield was 0.25 g. The melting point was 218°~219° C. The maximum absorption wavelength was 752 nm in ethanol.

EXAMPLE 3-4

Preparation of 1-γ-acetoxypropyl-3,3-dimethyl-5-chloroindo-1′-γ-acetoxypropyl-3′,3′-dimethyl-5′-chloroindo-2:2′-heptamethine perchlorate

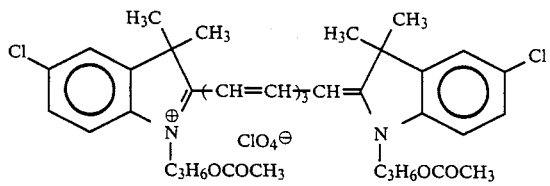

7.8 g of 1-γ-hydroxypropyl-2,3,3-trimethyl-5-chloroindolenium perchlorate prepared in Example 3-3, 3.2 g of 1-anilino-5-anilino-penta-1,3-diene hydrochloride, 1.8 g of sodium acetate, and 50 ml of acetic anhydride were reacted 110° C. for 1.5 hours. After cooling, the reaction mixture was poured into 200 of water. The mixture was then warmed with stirring. Crystals separated from the mixture, which were filtered off, and recrystallized from methanol several times. Thus, 1-γ-acetoxypropyl-3,3-dimethyl-5-chloroindo-1′-γ-acetoxypropyl-3′,3′-dimethyl-5′-chloroindo-2′-heptamethine perchlorate was obtained in the form of green crystals. The yield was 5.7 g. The melting point was 198° C. The maximum absorption wavelength was 750 nm in ethanol.

An infrared spectrum of the cyanine dye of Example 3-3, using a KBr tablet, shows a broad O-H stretching and vibration band at 3400 cm$^{-1}$, while in the case of the cyanine dye of Example 3-4, instead of the O-H band, a sharp band was observed at 1730 cm$^{-1}$ indicating the presence of an ester group.

EXAMPLE 3-5

Preparation of 1-β-acetoxyethyl-3,3-dimethyl-5-bromoindo-1′-β-acetoxyethyl-3′,3′-dimethyl-5′-bromoindo-2:2′-heptamethine perchlorate

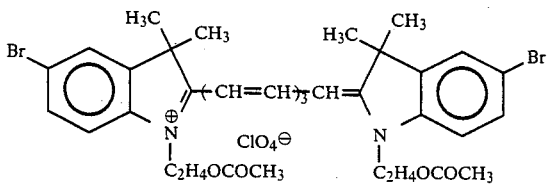

The procedure of Example 3-2 was repeated except that 1-β-hydroxyethyl-2,3,3-trimethyl-5-chloroindolenium bromide was replaced by 1-β-hydroxyethyl-2,3,3-trimethyl-5-bromoindolenium bromide (m.p. 208° C.), whereby 1-β-acetoxyethyl-3,3-dimethyl-5-chloroindo-1′-β-acetoxyethyl-3′,3′-dimethyl-5′-chloroindo-2:2′-heptamethine perchlorate was obtained.

The melting point was 226°~228° C. The maximum absorption wavelength was 752 nm in ethanol.

EXAMPLE 3-6

Preparation of 1-β-acetoxyethyl-3,3-dimethyl-1′-β-acetoxyethyl-3′,3′-dimethylindo-2:2′-heptamethine perchlorate

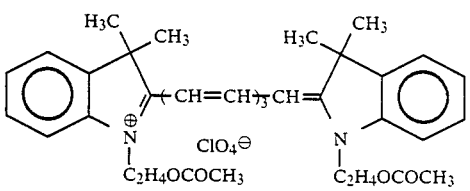

The procedure of Example 3-2 was repeated except that 1-β-hydroxyethyl-2,3,3-trimentyl-5-chloroindolenium bromide was replaced by 1-β-hyroxyethyl-2,3,3-trimethylindolenium bromide (m.p. 198°~199° C.), whereby 1-β-acetoxyethyl-3,3-dimethyl-1′-β-acetoxyethyl-3′,3′-dimethyl-5′-2:2′-heptamethine perchlorate was obtained.

The melting point was 144°~146° C. The maximum absorption wavelength was 753 nm in ethanol.

EXAMPLE 3-7

The cyanine dye synthesized in Example 3-1 was dissolved in methanol to obtain a 1 wt. % methanol solution of the cyanine dye.

This solution was applied by a spinner to an acryl substrate and dried to obtain a recording layer with a thickness of 450 Å on the substrate, whereby an optical information recording medium No. 3-1 according to the present invention was prepared.

This recording medium was subjected to a signal recording and reproduction test in which signals of 0.7 MHz were recorded in the recording medium by a semiconductor laser beam having a wavelength of 790 nm under the conditions that the beam diameter was 1.54 μm and the line speed was 1.2 m/sec. The recorded signals were then reproduced by a laser beam having a lower power than that of the laser beam for recording. The initial C/N value was 55 dB.

This recording medium was subjected to a preservability test in which the recording medium was allowed to stand in an oven at 70° C. for 40 days, and thereafter, signal recording and reproduction were performed in the same manner as mentioned above. The result was that the C/N value after the test was 48 dB. This indicates that the optical information recording medium in which the cyanine dye according to the present invention is employed has significantly better optical recording and reproduction characteristics as compared to conventional optical information recording mediums.

EXAMPLE 3-8

The cyanine dye synthesized in Example 3-3 was dissolved in 1,2-dichloroethane to obtain a 1 wt. % dichloroethane solution of the cyanine dye.

This solution was applied by a spinner to an acryl substrate and dried to obtain a recording layer with a thickness of 450Å on the substrate, whereby an optical information recording medium No. 3-2 according to the present invention was prepared.

This recording medium was subjected to the same signal recording and reproduction test as in Example 3-7. The result was that the initial C/N value was 54 dB.

This recording medium was further subjected to the same preservability test as in Example 3-7. The result was that the C/N value after the test was 51 dB, which indicates that the optical information recording medium No. 3-2 is as excellent as the optical information recording medium No. 3-1.

EXAMPLE 3-9

The cyanine dye synthesized in Example 3-6 was dissolved in ethanol to obtain a 1 wt. % ethanol solution of the cyanine dye.

This solution was applied by a spinner to an acryl substrate and dried to obtain a recording layer with a thickness of 450 Å on the substrate, whereby an optical information recording medium No. 3-3 according to the present invention was prepared.

The recording medium was subjected to the same signal recording and reproduction test as in Example 3-7. The result was that the initial C/N value was 56 dB.

This recording medium was also subjected to the same preservability test as in Example 3-7. The result was that the C/N value after the test was 52 dB, which indicates that the optical information recording medium No. 3-3 is as excellent as the optical information recording medium No. 3-1.

What is claimed is:

1. A cyanine dye having the formula (I):

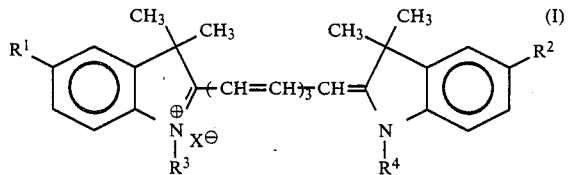

wherein $R^1$ is hydrogen, Cl or Br; $R^2$ is hydrogen, Cl or Br; $R^3$ is a methyl group, an ethyl group or a propyl group; $R^4$ is $-(CH_2)_nOH$; $X^-$ is an acid anion; and n is an integer of 2 or 3.

2. A cyanine dye having the formula (II):

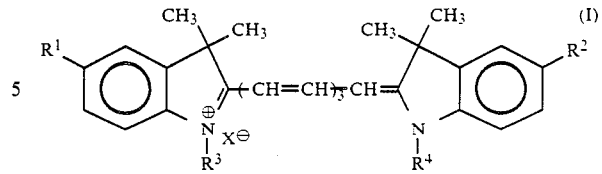

wherein $R^1$ is hydrogen, Cl or Br; $R^2$ is hydrogen, Cl, Br or a nitro group; $R^3$ is a methyl group, an ethyl group or a propyl group; $R^4$ is a methyl group or an ethyl group; and $X^-$ is an acid anion, provided that the case where $R^3$ and $R^4$ are both an identical alkyl group, and $R^1$ and $R^2$ are an identical group, is excluded.

3. The cyanine dye as claimed in claim 2, wherein $R^1$ is hydrogen; and $R^2$ is Cl or Br.

4. The cyanine dye as claimed in claim 2, wherein $R^1$ is Cl or Br; and $R^2$ is hydrogen.

5. A cyanine dye having an formula (I):

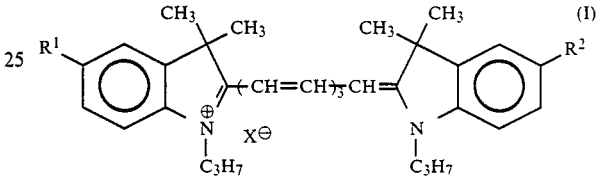

wherein $R^1$ and $R^2$ are each hydrogen, Cl and Br; and $X^-$ is an acid anion, provided that the case where $R^1$ and $R^2$ are in identical group is excluded.

6. A cyanine dye having the formula (I):

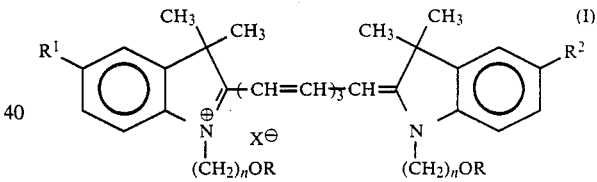

wherein $R^1$ and $R^2$ are each hydrogen, Cl or Br; R is hydrogen or an acetyl group; and n is an integer of 2 or 3.

7. The cyanine dye as claimed in claim 6, wherein $R^1$ is hydrogen; and $R^2$ is Cl or Br.

8. The cyanine dye as claimed in claim 6, wherein $R^1$ is Cl or Br; and $R^2$ is hydrogen.

* * * * *